(12) United States Patent  
Schmidt et al.

(10) Patent No.: US 12,144,281 B2  
(45) Date of Patent: Nov. 19, 2024

(54) AGRICULTURAL PRODUCT APPLICATION SYSTEM AND METHOD OF CONTROLLING SUCH

(71) Applicant: Vaderstad LLC, Wahpeton, ND (US)

(72) Inventors: Michael Dennis Schmidt, Maple Grove, MN (US); Collin David Miller, Mapleton, ND (US)

(73) Assignee: Vaderstad LLC, Wahpeton, ND (US)

( * ) Notice: Subject to any disclaimer, the term of this patent is extended or adjusted under 35 U.S.C. 154(b) by 532 days.

(21) Appl. No.: 17/244,164

(22) Filed: Apr. 29, 2021

(65) Prior Publication Data

US 2021/0337719 A1 Nov. 4, 2021

Related U.S. Application Data

(60) Provisional application No. 63/017,126, filed on Apr. 29, 2020.

(51) Int. Cl.
| | | |
|---|---|---|
| *A01C 7/10* | (2006.01) | |
| *A01C 21/00* | (2006.01) | |
| *G01C 21/00* | (2006.01) | |
| *A01C 7/08* | (2006.01) | |

(52) U.S. Cl.  
CPC ............ *A01C 7/105* (2013.01); *A01C 21/005* (2013.01); *G01C 21/00* (2013.01)

(58) Field of Classification Search  
None  
See application file for complete search history.

(56) References Cited

U.S. PATENT DOCUMENTS

| | | | |
|---|---|---|---|
| 9,955,625 B2 | 5/2018 | Baurer et al. | |
| 2014/0216314 A1* | 8/2014 | Bourgault | A01B 49/06 |
| | | | 111/174 |
| 2020/0260637 A1* | 8/2020 | Thompson | A01B 79/005 |
| 2021/0127559 A1* | 5/2021 | Hubner | A01C 7/206 |
| 2021/0144907 A1* | 5/2021 | Altepeter | A01C 7/088 |

OTHER PUBLICATIONS

UK Intellectual Property Office, Search Report for related UK Application No. GB2007204.7, dated Nov. 12, 2020.

* cited by examiner

*Primary Examiner* — Aniss Chad  
*Assistant Examiner* — Madison R. Inserra  
(74) *Attorney, Agent, or Firm* — Mai D. Lauer; Westman, Champlin & Koehler P.A.

(57) ABSTRACT

An agricultural product application system such as an air seeder or a sprayer includes a controller, a product source, and a plurality of product dispensing sections. Each of the dispensing sections include a metering module and a product sensor arranged to detect product passing through one or more product dispensing devices. The controller determines a dispense activation delay ($d_{on}$) for each product dispensing section by measuring a delay between activation of the metering module and the product sensor detecting product arriving. The delay is optionally used for automatic control of the product dispensing sections and/or for logging georeferenced application data.

16 Claims, 7 Drawing Sheets

AGRICULTURAL PRODUCT APPLICATION SYSTEM AND METHOD OF CONTROLLING SUCH

CROSS-REFERENCE TO RELATED APPLICATION

This application claims the benefit of the filing date of U.S. Provisional Patent Application 63/017,126, "Agricultural Product Application System and Method of Controlling Such," filed Apr. 29, 2021, the entire disclosure of which is incorporated herein by reference

FIELD

Embodiments of the present disclosure relate to agricultural product application systems such as air seeders. More particularly, embodiments of the present disclosure relate to apparatus and methods for controlling agricultural product application systems.

BACKGROUND

Agricultural product application systems include, by way of example, seeders, spreaders and sprayers which serve to apply products or crop inputs such as seed, fertilizer and pesticides through a plurality of product dispensing devices laterally spaced over a working width. Seeders for example typically include a plurality of seeding units which are configured to inject particulate material into a ground surface. In another example, sprayers typically include a plurality of nozzles or drop hoses which are configured to apply a crop input solution onto a growing crop or ground surface.

Some systems are adapted to apply more than one product simultaneously, for example seed and fertilizer or two fertilizer products. In such systems, the different products are typically metered independently to allow for different application rates of each of the applied products. Furthermore, many product application systems include multiple metering modules, each serving to meter product to a respective section of the plurality of product dispensing devices.

The metered product is normally conveyed from the metering modules to the product dispensing devices by pipes or tubes, although gravity and active conveyance systems are also known. Depending on the architecture of the system, the metering modules may be located a significant distance (several yards for example) away from the dispensing devices. As a result, there is a delay between commanding activation of the metering modules and the product arriving at the dispensing device. This delay will often vary and sometimes between metering modules depending on the distance to the dispensing devices, type of product, application rate and, in the case of air seeders, on fan speed or pneumatic system pressure.

In lower specification systems, this 'dispense activation delay' is allowed for by the operator with early activation and early deactivation of the metering modules using an 'educated guess' based on the location and speed of the tractor with respect to a field marker for example. Higher specification systems are known to electronically store a manually-entered 'on-delay' and 'off-delay' value for one or more metering modules. In this case, the operator will either guess the values or measure the time delay for each metering module with the help of a second person. As such, the set up procedure is time consuming and prone to inaccuracies. Furthermore, the dispense activation delay values do not take into account changing operating conditions.

Accordingly, a need exists to improve the accuracy of the control of agricultural product application systems and to reduce the time required to set up the systems.

SUMMARY

In some embodiments, an agricultural product application system comprises a controller, a product source, and a plurality of product dispensing sections. Each product dispensing section comprises one or more product dispensing devices, a metering module in communication with the controller and the product source and configured to control a flow of product from the product source to the one or more product dispensing devices, and a product sensor in data communication with the controller and configured to detect product passing through the one or more product dispensing devices. The controller is configured to determine a dispense activation delay for each product dispensing section by measuring a delay between activation of the metering module and the product sensor detecting product arriving, and to control the system based upon the dispense activation delay.

Advantageously, the product sensor in association with the product dispensing devices allows the controller to automatically measure the 'on delay' and/or 'off-delay', which may be used to control one or more aspects of the system.

In one embodiment, the controller is configured to control activation of the metering modules based upon the dispense activation delay. For example, the 'on delay' for each metering module can be provided as an input to control logic or a control algorithm which controls activation of the metering modules. Similarly, the 'off delay' for each metering module can be provided as an input to control logic or a control algorithm which controls deactivation of the metering modules.

The system may comprise a positioning system, wherein the controller is configured to control automatic activation of the metering modules based upon a position signal generated by the positioning system, and upon a product application map. The product application map may comprise a georeferenced application prescription.

In one embodiment, the controller is configured to generate and log georeferenced application data corresponding to product applied by the product dispensing sections, wherein the georeferenced application data is generated based upon the dispense activation delay of each product dispensing section.

The agricultural product application system may comprise a display device in communication with the controller, wherein the dispense activation delay for each product dispensing section is displayed on the display device.

The product sensor or sensors may be mounted proximate to the point at which the product is dispensed onto or into the ground. Advantageously this provides a more accurate determination of the dispense activation delay. In one embodiment, each one of the product dispensing devices comprises a tube connected at a first end to the metering module, wherein the product sensor is mounted proximate to a second end of the tube, for example within three feet of the end of the tube.

In one embodiment, the controller is configured to determine and use a dispense deactivation delay for each product dispensing section by measuring the delay between deactivation of the metering module and the product sensor detecting cessation of product flow. The product sensor may be used to determine a deactivation (or off-) delay.

The agricultural product application system may be embodied in an air seeder wherein each one of the one or more product dispensing devices comprises a seeding unit. Alternatively, agricultural product application system may be embodied in an agricultural spraying machine (or crop sprayer) wherein each one of the one or more product dispensing devices comprises one or more nozzles for spraying a liquid plant protection product.

In some embodiments, a method of controlling an agricultural product application system comprises activating a metering module that is in communication with a product source, determining a dispense activation delay by measuring a delay between activation of the metering module and detection of the product passing through a product dispensing device at a location downstream of the metering module, and controlling the system based upon the dispense activation delay.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

Further advantages will become apparent from reading the following description of specific embodiments with reference to the appended drawings in which.

While the figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art, which fall within the scope of this disclosure.

DETAILED DESCRIPTION

The present disclosure generally relates to agricultural application machines for dispensing product to agricultural crop fields, and more specifically, but not by limitation, to the control of such machines.

Figure 1A:
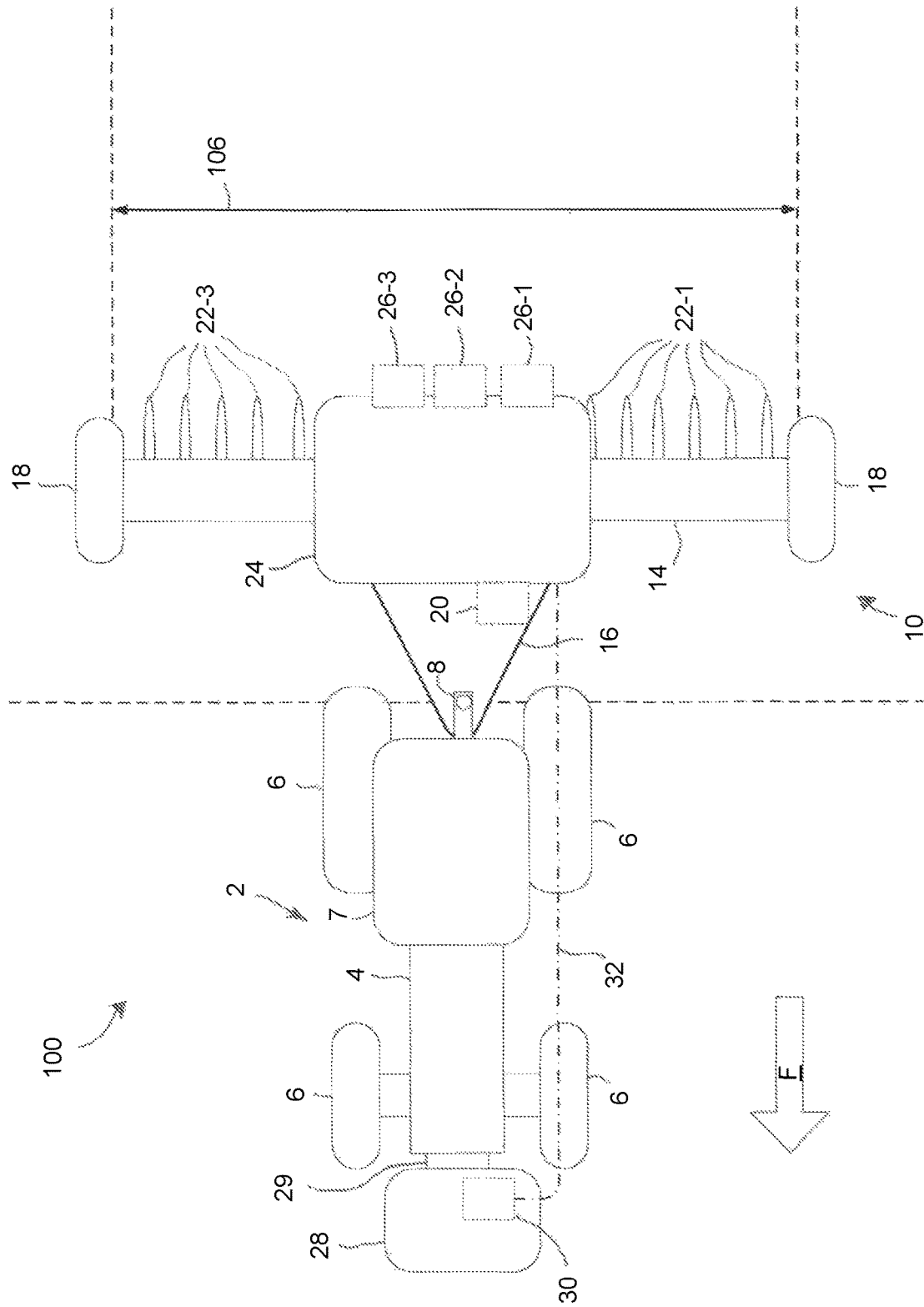
FIG. 1A is a simplified schematic top plan view of a tractor and air seeder combination.

FIG. 1A illustrates an agricultural product application system embodied in an agricultural tractor and air seeder combination 100. The agricultural tractor 2 comprises a frame 4 supporting ground-engaging wheels 6, a cab 7, and a towing hitch 8. The air seeder 10 comprises a seeder frame 14 having a forwardly-extending drawbar tongue 16 coupled to the towing hitch 8. The seeder frame 14 is carried on support wheels 18 mounted thereto and may have one or more frame sections. A controller 20 is carried by the seeder 14 frame and is represented schematically in FIG. 1A. The controller 20 will be described in more detail below.

The tractor and seeder combination 100 represents one embodiment of an agricultural product application system that serves to meter and dispense particulate material, the most common examples of which are seed and granular fertilizer. It should be understood that the combination 100 is representative of many different types and configurations of agricultural product application systems suitable for dispensing metered particulate material. Although the terms "fertilizer" and "seed" are used to explain the disclosed embodiments it should be understood that the apparatus described may be suitable for applying other particulate material. Further, some agricultural product application systems may apply only one particulate material (i.e., seed only, fertilizer only, etc.), while other applications may apply two or more different particulate materials (i.e., seed and fertilizer, etc.).

Returning to FIG. 1A, the tractor 2 pulls the air seeder 10 across the ground in a forward direction of travel F. The air seeder 10 has a working width 106 across which seed and optionally fertilizer is metered and dispensed. A plurality of ground-engaging disc openers 22 are configured to create furrows for placement of particulate material and are spaced along the frame 14 in a direction that is transverse to the direction of travel F. A seed hopper 24 is carried on the frame 14 and serves as a first particulate material source which is periodically filled by the operator.

Seed is dispensed across the working width 106 by three product dispensing sections which each include a set of product dispensing devices, a metering module 26-1, 26-2, 26-3, and a product sensor. The working width 106 defines a seeding area that can be seeded during a single pass of seeder 10. In the illustrated embodiment of FIG. 1A, the product dispensing devices comprise seeding units that each include one of the disc openers 22. As such, the disc openers 22 are grouped into three sets arranged side-by-side and each set serving to create the furrows corresponding to the three product dispensing sections. However, only the disc openers 22 for the first and third sections 22-1, 22-3 are visible, wherein the disc openers 22 for the second section are hidden from view by the hopper 24.

The working width 106 is the distance between the outermost seeding units, and generally corresponds to a transverse length of frame 14. Examples of width 106 include, but are not limited to, 30, 40, 50, and 60 feet.

The three metering modules 26-1, 26-2, 26-3 (shown schematically in FIG. 1A) are supported on the frame 14 and are each in electronic communication with the controller 20. Each metering module 26-1, 26-2, 26-3 is in fluid communication with the seed hopper 24 and configured to control the flow of seed from the seed hopper 24 to a respective set of the seeding units. Thus, the seed hopper 24 may supply each of the seeding units.

A fertilizer hopper 28 is carried on front linkage 29 of tractor 2. The fertilizer hopper 28 serves as a second particulate material source, which is also periodically filled by the operator. A fourth product dispensing section comprises a fourth metering module 30 that shown schematically and is mounted to the underside of the fertilizer hopper 28. The fourth metering module 30 is in electronic communication with the controller 20 and is configured to control a flow of fertilizer from the fertilizer hopper 28 to all seeding units across the working width via a delivery tube 32, which is shown schematically by a dashed line.

It should be appreciated that the product dispensing devices may be shared between product dispensing sections. For example, the fourth metering module 30 described above includes the seeding units that are supplied also with seed by the first, second, and third metering modules 26.

Figure 1B:
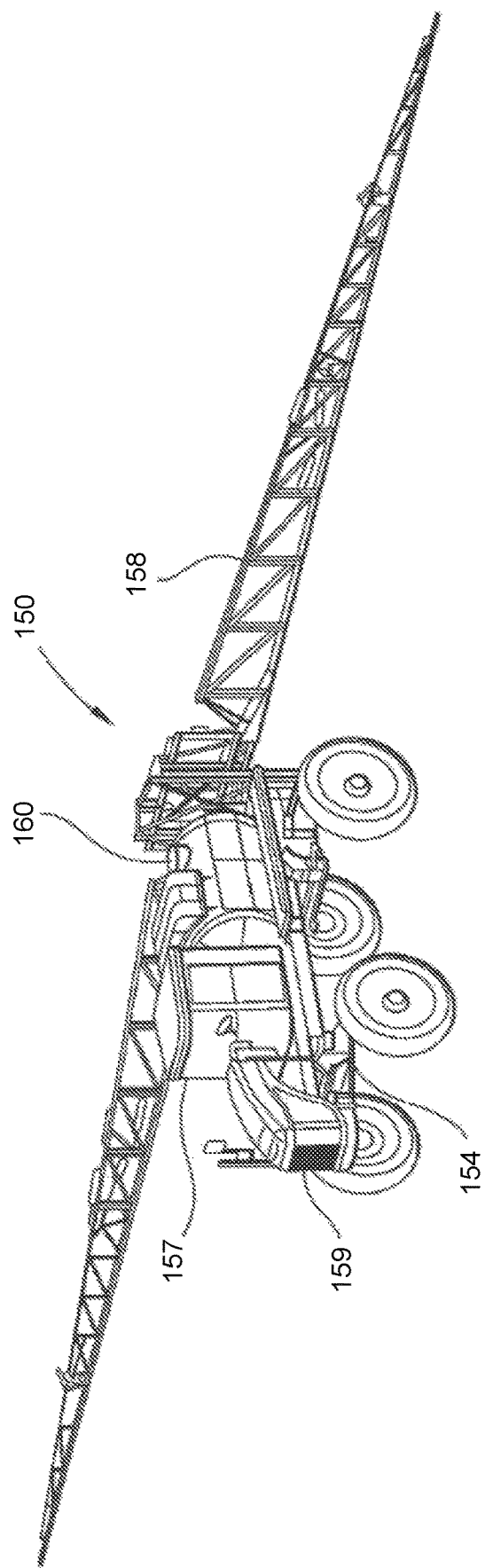
FIG. 1B is a perspective view of a self-propelled crop sprayer.

FIG. 1B illustrates a self-propelled crop sprayer 150. The sprayer 150 has a frame 154 supporting ground-engaging wheels, a cab 157, a transversely-extending applicator boom 158, and an engine enclosed under a hood 159. The application system includes a product tank 160 for holding a liquid product to be applied. The product tank 160 serves as a liquid material source, which is periodically filled by the operator. Liquid product is delivered from the product tank 160 to nozzles carried on boom 158 by a liquid delivery system that includes one or more metering modules for controlling the liquid delivery flow rate and/or system pressure.

Figure 2:
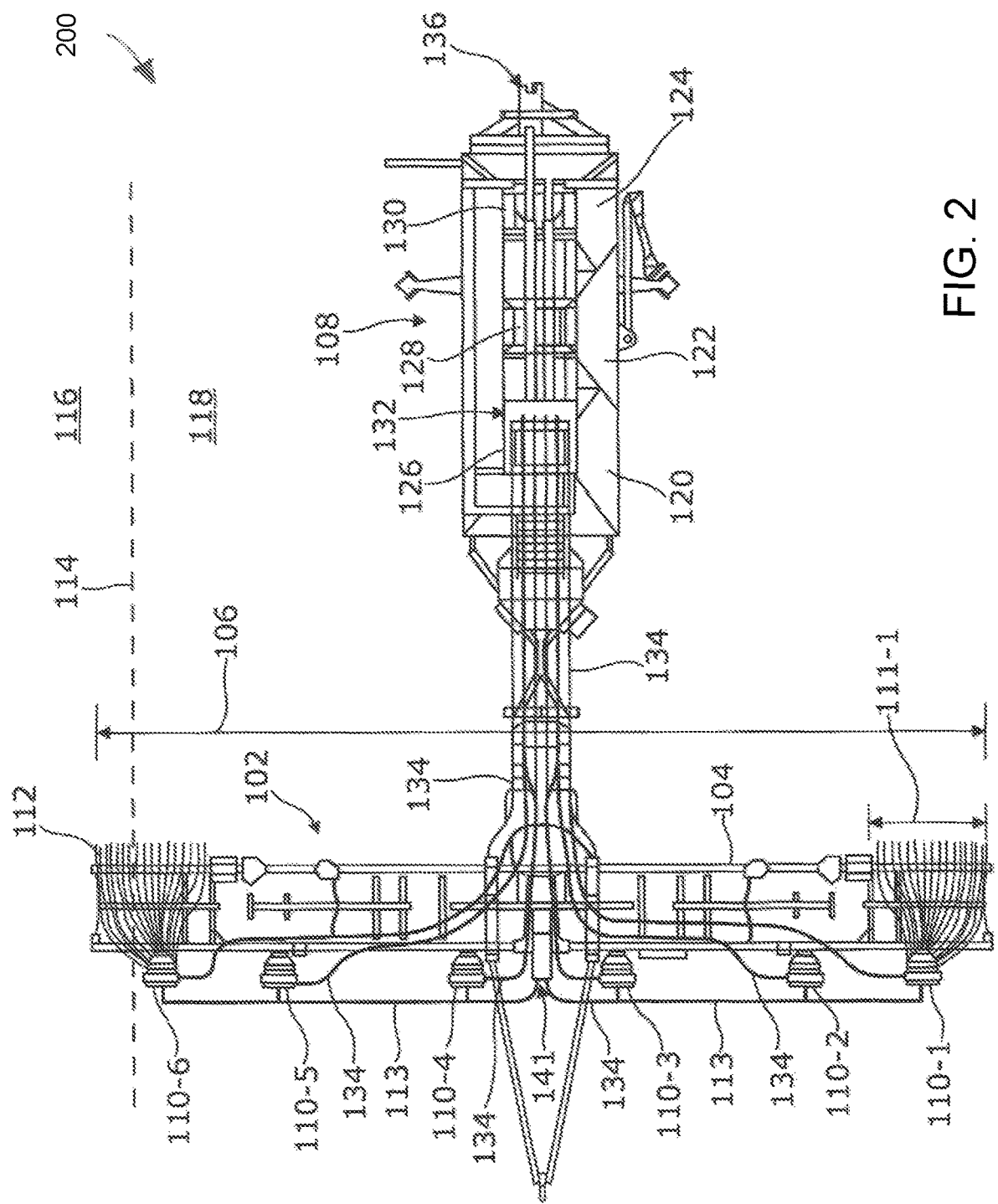
FIG. 2 is a schematic top plan representation of an air seeder.

FIG. 2 illustrates an agricultural product application system embodied in an air seeder and cart combination 200. The air seeder 102 and/or component parts thereof may be constructed in a similar manner to that of the agricultural seeder implement disclosed in U.S. Pat. No. 8,919,267, "Agricultural Seeder Implement," granted Dec. 30, 2014, the entire contents of which is incorporated herein by reference. In the illustrated embodiment, the seeder 102 includes a frame 104 that supports a plurality of seeding units. The seeding units may comprise ground-engaging openers such as the disc openers 22 shown in FIG. 1A, the openers being configured to create furrows in the ground. The seeding units may also include drop tubes for placement of particulate material in the furrows. In one example, a seeding unit comprises a seed flute configured for broadcast seeding. The seeding units are distributed across the working width 106.

Cart 108 is connected to and pulled behind seeder 102. In an alternative configuration, the cart 108 may lead the seeder 102.

The combination 200 includes a plurality of metering modules spaced apart along the seeder 102. In one example, at least two metering modules are used. In the illustrated embodiment, system 200 includes six metering modules 110-1, 110-2, 110-3, 110-4, 110-5, and 110-6, which are also referred to herein either collectively or individually as metering module(s) 110. Of course, more than or less than six metering modules can be used.

Each metering module 110 is a component part of a respective product dispensing section having a section width 111 and each comprising at least one of the seeding units. FIG. 2 shows the section width 111-1 of the section supplied by metering module 110-1. In the illustrated embodiment, each metering module 110 meters particulate material to a plurality of the seeding units via tubes 112. By way of example, but not limitation, in the embodiment illustrated in FIG. 2, the seeder 102 has 96 seeding units. In the illustrated embodiment each module 110 meters particulate material to a different section each comprising a set of 16 seeding units. However, the number of metering modules 110 and seeding units can be selected based on, for example, the width 106 of seeder 102 and desired spacing between furrows. The lines from metering modules 110-2, 110-3, 110-4, and 110-5 to their respective seeding units are not shown in FIG. 2 for illustration convenience.

Each metering module 110 is configured to control a flow rate of particulate material to its respective seeding units. The flow rate can be controlled, for example, based on a desired application rate per acre and a speed of travel of the implement across the ground.

In one example, gravity drop meters can be used in modules 110 for metering the particulate material to the seeding units. In the illustrated embodiment, the particulate material is delivered pneumatically from modules 110 to the ground injection points at the seeding units. For example, one or more blowers 141 are provided on the seeder 102 providing airflow to modules 110 via pipes 113.

Each metering module 110 may be configured to stop the flow of particulate material to one or more of the seeding units in a product dispensing section. For example, each metering module 110 can be configured to stop the flow of particulate material to individual ones, or all, of the seeding units being metered by the module 110. In this manner, a zone or sectional control scheme can be implemented to stop a portion of the seeding units across seeder 102 to prevent application of seed to areas of ground where seeding is not desired and/or to prevent double application (i.e., seeding an area of ground that has already been seeded). By way of example, but not limitation, line 114 in FIG. 2 generally illustrates a boundary between a previously seeded area 116 and an area 118 to be seeded during a current pass of implement 102. Module 110-6 is controlled to stop the flow of particulate material to the seeding units that are positioned within area 116.

Cart 108 includes one or more tanks or bins for holding particulate material to be delivered to the seeding units of the seeder 108. Cart 108 illustratively includes a plurality of tanks 120, 122, and 124 each configured to hold a particulate material to be delivered to the seeding units and each serving as a particulate material source which is periodically filled by the operator. Of course, less than or more than three tanks can be used. Each tank 120, 122, and 124 has an opening 126, 128, and 130, respectively, in a bottom portion thereof.

The particulate material can be provided from the cart 108 to the seeder 102 using any suitable distribution mechanism. For example, a mechanical mechanism such as an auger can be used. In another example, the particulate material is delivered to seeder 102 pneumatically.

In the illustrated embodiment, a distribution assembly 132 is configured to receive particulate material from tank 120 and pneumatically distribute the particulate material to the metering modules 110 via distribution tubes 134. In the illustrated example, a plurality of tubes 134 are provided with each one of the tubes 134 supplying one of the metering modules 110. A blower 136 is configured to provide a flow of air to distribution assembly 132 to assist the flow of particulate material through tubes 134. In other examples, additional distribution assemblies 132 can be provided for tanks 122 and/or 124 for providing particulate material from those tanks to metering modules 110.

Figure 3:
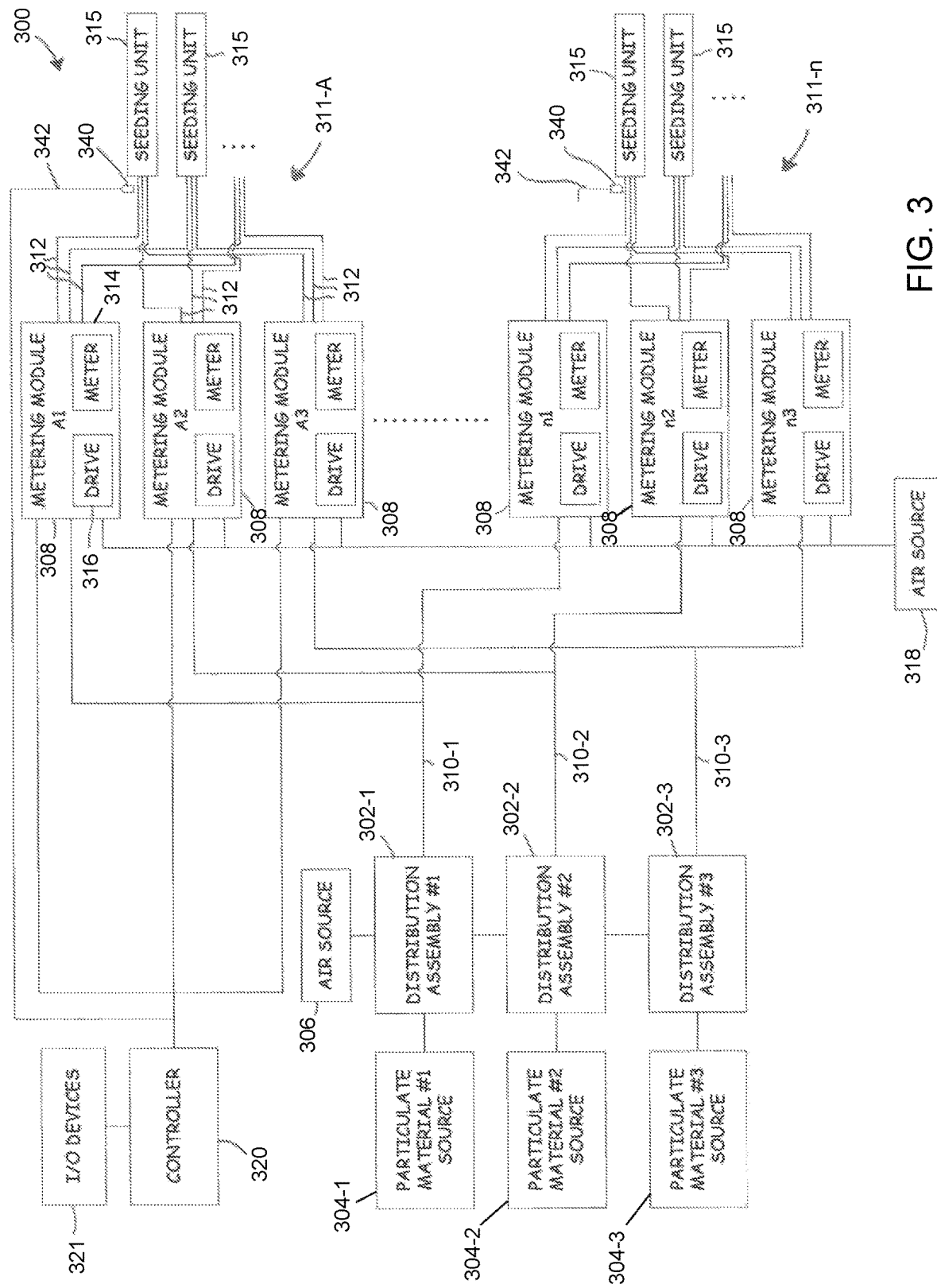
FIG. 3 is a schematic representation of an agricultural product application system.

FIG. 3 is a schematic representation of an agricultural product application system 300. As shown, three separate distribution assemblies 302 each receive particulate material from a respective product source 304 and, using a shared air source 306, provides the particulate material to metering modules 308 through distribution tubes 310.

System 300 comprises a plurality of product dispensing sections 311-A through 311-n, each comprising a set of seeding units 315 which are fed particulate material by three metering modules 308 through tubes 312. Each tube 312 is connected at a first end to a respective one of the metering modules 308 and adapted to receive metered product from that metering module 308. Each tube 312 has a second end for dispensing the metered product, the second end being opposite the first end and secured so as to deliver the metered product into a furrow, for example opened by disc openers 22 (FIG. 1). In one embodiment, the second end of each tube 312 is secured to a seed boot of a disc opener like that disclosed by U.S. Pat. No. 9,686,908, "Seed Boot Mounting," granted Jun. 27, 2017, the entire contents of which is incorporated herein by reference. It should be understood that more than one tube 312 may be connected to a given opener and thus associated with a single furrow.

FIG. 3 illustrates only two product dispensing sections 311. However, it should be understood that the system may comprise more or less product dispensing sections and that 'n' can be any practical integer depending on the working width of the implement and on the respective section widths. In one embodiment, the system 300 comprises six product dispensing sections (n=6) and thus eighteen metering modules (3×n), each metering module 308 being supplied with particulate material from one of the product sources 304 via the respective distribution assembly 302.

Each metering module 308 includes a meter 314 and a meter drive 316. Meters 314 can be driven using any suitable driving mechanism. For example, meters 314 can comprise metering rollers that are turned by an electric, hydraulic, and/or pneumatic drive. In one example, a ground-engaging wheel can be used to turn a metering roller.

Each metering module 308 includes a drive 316 that can be controlled individually, for example using a controller 320. This allows the flow through a particular one of the metering modules 308 to be controlled independent of other ones of the metering modules 308. Input/output devices 321 can be provided, for example in a cab of a tractor, to allow a user to interface with the application system 300. The user can, for example, adjust particulate application rates or activate and deactivate selected seeding units 315. An air source 318 provides a flow of air to metering modules 308 for pneumatically delivering the material to seeding units 315.

In one embodiment, a controller 320 can be configured to control operation of air sources 306 and 318. For example, the controller 320 can turn on/off air sources 306 and/or 318 and adjust a flow rate of the air.

In one embodiment, the controller 320 can be configured to control a gate or other suitable mechanism at product sources 304 that controls a flow of product from sources 304. For example, the controller 320 can be used to stop material flow into the respective distribution assemblies 302.

Each product dispensing section 311 further comprises a product sensor 340 mounted adjacent the second end of one dispensing tube 312 of that dispensing section 311. In one embodiment the product sensor is a proximity sensor which may for example be a capacitive or photoelectric sensor that is mounted to the tube 312 and adapted to detect flow (or absence of flow) of particulate matter passing through the tube 312. For example, the product sensor 340 may be similar to the seed sensor disclosed in U.S. Patent Application Publication 2019/0159398, "Agricultural Input Placement Systems, Methods, and Apparatus," published May 30, 2019, the entire contents of which is incorporated herein by reference.

The product sensor 340 is in data communication with the controller 320 via a wired or wireless link 342. In response to the detection of product (for example a seed) passing through the tube proximate (for example within six inches) to the sensor 340, the product sensor 340 is operable to generate a product detection signal that is communicated to the controller 320.

Although the illustrated system 300 of FIG. 3 comprises three product sources 304 with dedicated distribution assemblies 302, it should be understood that product application machines having more or less than three product sources may also be used. In an example, an air seeder may be adapted to apply only one product.

Figure 4:
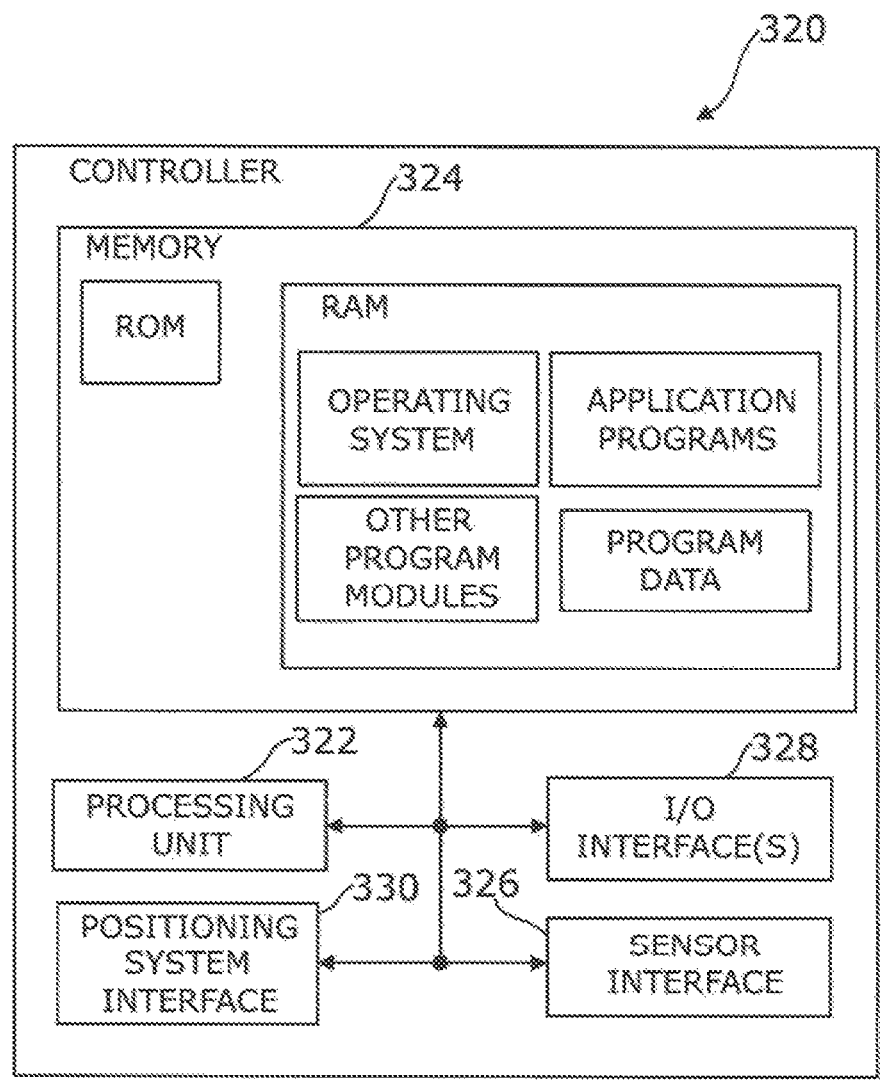
FIG. 4 is a schematic representation of a controller for the agricultural product application system of FIG. 3.

FIG. 4 illustrates one embodiment of the controller 320. The controller 320 can include a processing unit 322 and memory 324 coupled to the processing unit 322. In the illustrated example, the processing unit 322 is a computer processor with associated memory and timing circuitry that is a functional part of the system and is activated by, and facilitates functionality of other parts or components of the system. The memory 324 can include computer storage media such as read only memory and random access memory. A number of program modules may be stored, such as application programs that can include instructions for the controller 320.

A sensor interface 326 can be configured to receive feedback from sensors on the seeder including the product sensor 340 and, for example, a speed sensor that indicates a speed of travel of the seeder. I/O interfaces 328 can be configured to receive signals from input devices that are operated by the user and provide signals to output devices, such as a display screen. A positioning system interface 330 can receive positioning information indicating a spatial location of the seeder. For example, a global positioning system (GPS) can be used to track a location of the seeder. The location information can be used by controller 320 to automatically control the metering modules 308. For example, the controller 320 can determine that an area over which the seeder is traveling (e.g., area 116 in FIG. 2) has already been seeded and automatically stop particulate material flow to the seeding units in that area. In another example, other inputs such as, but not limited to, status information from material gates, air sources, etc., can be received at the controller 320.

It should be understood that features described in relation to the embodiments of FIGS. 3 and 4 may also be included in the embodiments of FIGS. 1A, 1B, and 2. For example, the seeder of FIG. 2 may include the controller 320 and features connected thereto, including the product sensors 340 for detecting the presence of product in tubes 112. Furthermore, the controller 320 may be embodied in the implement, for example the seeders 10, 102, in the cabs 7 of the tractor 2, or distributed between the seeder and the cab.

In the described embodiments of FIGS. 1-4, product is dispensed from metering modules 26, 110, 308 onto a field via tubes or pipes 112, 312. Depending on the architecture and layout of the machine concerned, the distance between the metering modules and the product dispensing point (in other words the length of tube 112, 312) will vary between the product dispensing sections 311. As such, the time taken for product to travel from the metering module to the dispensing point will also vary from section to section.

The controller 320 is configured to determine a dispense activation delay for each product dispensing section 311 by measuring a delay between activation of the metering module 308 and the product sensor 340 detecting product arriving. Measuring of such an 'on-delay' may be carried out periodically or automatically at every instance a metering module is activated from an 'off' state. For example, if activation of a metering module of a given section 311 is commanded at time $t_a$ and product is detected by the product sensor at time '$t_a+d_{on}$', then the 'on-delay' is $d_{on}$, expressed in seconds for example.

The product sensors 340 may be mounted proximate to the dispensing end of the dispensing tubes 312 or disposed further 'upstream' towards the metering module. Provided the distance between a metering module 308 and a corresponding product sensor 340 is known, then the delay, or time taken for the product to reach the product sensor 340 can be determined. In one embodiment, an average speed of the product between the metering module 308 and the product sensor is calculated from the measured delay and the known separation. The average speed of the product is then used to extrapolate a total on-delay corresponding to the time taken to reach the dispensing end of the dispensing tubes 312.

The controller 320 may be further configured to determine a dispense deactivation delay for each product dispensing section 311 by measuring a delay between deactivation of the metering module 308 and the product sensor 340 detecting cessation of product flow. Measuring of such an 'off-delay' may be carried out periodically or automatically at every instance a metering module is deactivated from an 'on' state. For example, if deactivation of a metering module of a given section 311 is commanded at time $t_d$ and cessation of product flow is detected by the product sensor at time '$t_d+d_{off}$', then the 'off-delay' for that given section 311 is $d_{off}$, expressed in seconds for example.

The determined values for 'on-delay' and/or 'off-delay' are used to control the product application system 100, 150, 200, 300.

In one embodiment, the controller 320 is configured to control activation of the metering modules 308 based upon the respective on-delay $d_{on}$. For example, the controller 320 may be configured to control automatic activation of the metering modules based upon a position signal generated by the positioning system, and upon a product application map stored in the memory 324. The product application map may comprise a georeferenced application prescription for each product being dispensed by the application system 300. In one example, the product application map includes a georeferenced prescription for nitrogen, phosphorus, and potassium, each product being stored in a respective tank as a product source 304. A control algorithm executed by the controller 320 for controlling activation of each metering module 308 uses the determined on-delay values $d_{on}$ as input parameters.

In another embodiment, the controller is configured to generate and log georeferenced application data corresponding to product applied by the product dispensing sections 311. A record in the form of a product application map of the product applied is helpful in analyzing crop costs and financial returns. The georeferenced application data is generated based upon the dispense activation delay values for each product dispensing section 311. Taking account of the activation delay provides for a more accurate application record.

Figure 5:
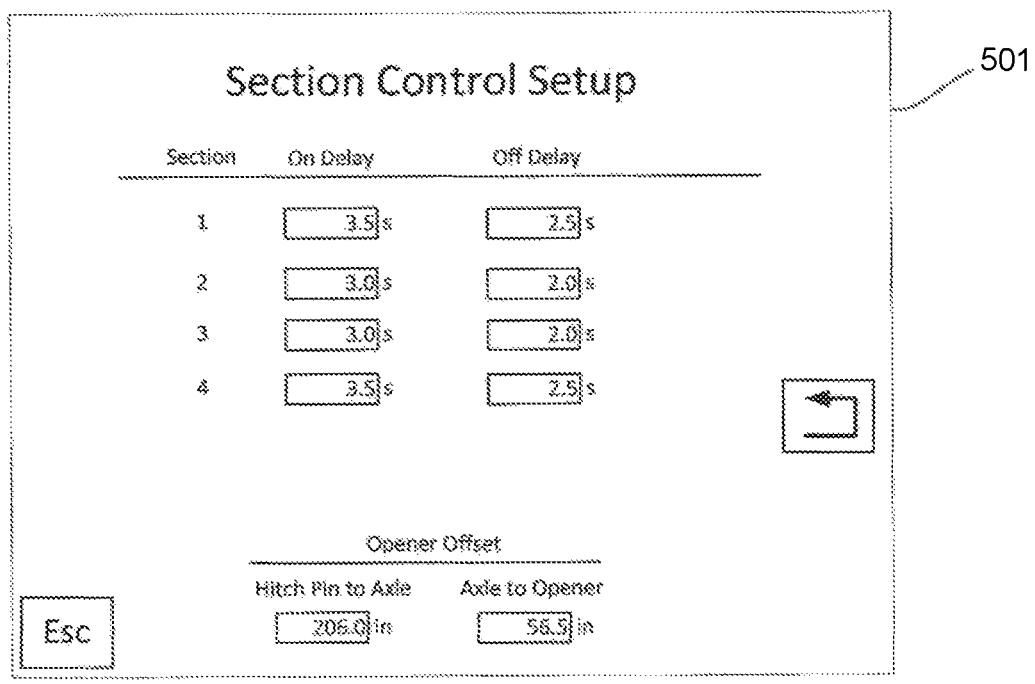
FIG. 5 is a representation of a displayed 'Section Control Setup' screen on a graphical user interface.

As mentioned above, the controller 320 may be connected to a display device and configured to generate display data for displaying on the display device. FIG. 5 shows a representation of a 'Section Control Setup' screen displayed by a display device 501. In the illustrated example the 'On-delay' and 'Off-delay' values $d_{on}$, $d_{off}$ are displayed for each of four sections. These values are automatically updated by the controller 320.

FIG. 5 also shows 'Opener Offset' values. A 'Hitch Pin to Axle' value is the distance from the implement's hitch connector to the front axle of the implement. An 'Axle to Opener' value is the distance from the front axle of the implement to the end of the tube where the product enters the ground. Both values are typically entered manually by an operator and are used by the controller as inputs together with a position signal from the positioning system to activate and deactivate the metering modules 308.

Figure 6:
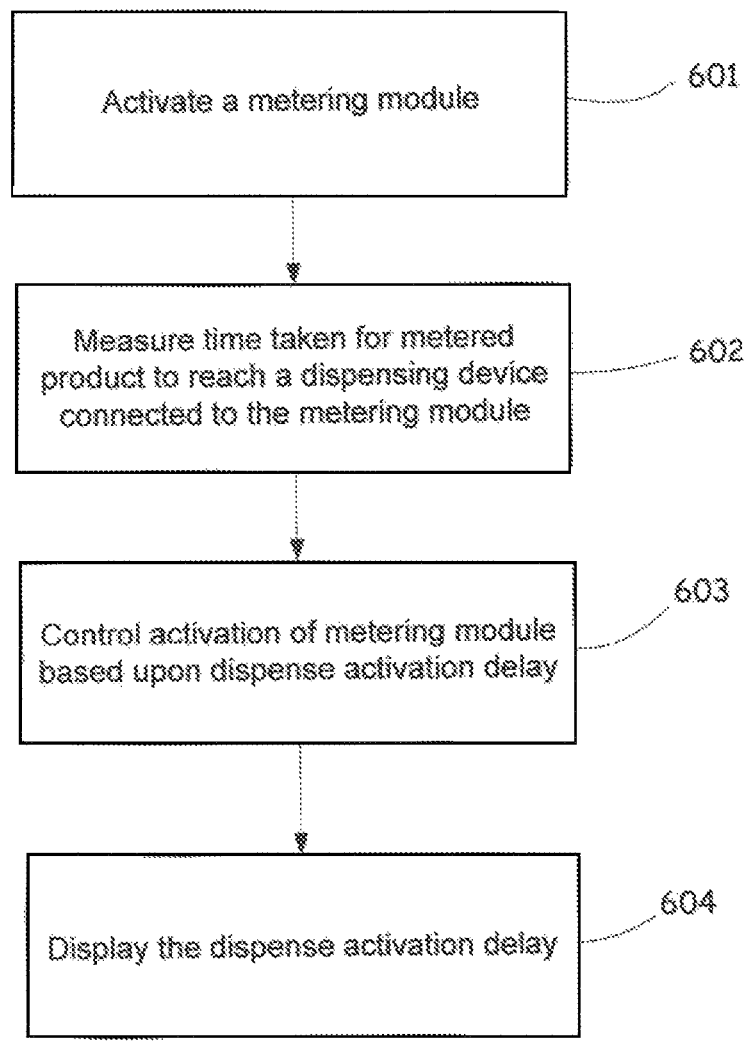
FIG. 6 is a flow chart of a method of controlling an agricultural product application system.

FIG. 6 is a simplified flow chart illustrating a method controlling an agricultural product application system. Block 601 represents activating a metering module in communication with a product source. Block 602 represents measuring the time taken for product to reach a dispensing device from the metering module. Block 603 represents controlling activation of the metering module based upon the determined activation delay. The dispense activation delay is displayed, represented by block 604.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

The invention claimed is:

1. A combination comprising:
   an air seeder, comprising:
      a controller;
      a first source of a first product, the first source comprising a first gate;
      a second source of a second product, the second source comprising a second gate;
      a first distribution assembly configured to receive the first product from the first source;
      a second distribution assembly configured to receive the second product from the second source;
      an air source configured to provide a combined product from the first and second distribution assemblies to a first metering module, the combined product comprising the first product and the second product; and
      a dispensing section comprising:
         a plurality of seeding units;
      the first metering module being in communication with the controller and the first and second product distribution assemblies and configured to control a flow of the combined product-to the plurality of seeding units; and
      a sensor in data communication with the controller and configured to detect the combined product passing through at least one of the plurality of seeding units;
      wherein the controller is configured to:
         control the first gate to control flow of the first product from the first source to the first distribution assembly;
         control the second gate to control flow of the second product from the second source to the second distribution assembly; and
         determine a dispense activation delay for the dispensing section by measuring a delay between activation of the first metering module and the sensor detecting the combined product arriving, and to control the first metering module based upon the dispense activation delay; and
a tractor coupled to the air seeder and configured to pull the air seeder through an agricultural field, wherein the tractor comprises:
a third source of a third product; and
a delivery tube through which the third product flows from the third source to the air seeder.

2. The of claim 1, further comprising a positioning system, wherein the controller is configured to control automatic activation of the metering module based upon a position signal generated by the positioning system, and upon a product application map.

3. The of claim 2, wherein the product application map comprises a georeferenced application prescription.

4. The of claim 1, wherein the controller is configured to generate and log georeferenced application data corresponding to the combined product applied by the dispensing section, wherein the georeferenced application data is generated based upon the dispense activation delay of the dispensing section.

5. The of claim 1, further comprising a display device in communication with the controller, wherein the display device is configured to display the dispense activation delay for the dispensing section.

6. The of claim 1, wherein each one of the plurality of seeding units comprises a tube connected at a first end to the metering module, wherein the sensor is mounted on the tube.

7. The of claim 1, wherein the controller is configured to determine and use a dispense deactivation delay for the dispensing section by measuring a delay between deactivation of the metering module and the sensor detecting cessation of product flow.

8. The of claim 1, wherein at least one of the first and second sources comprises a seed hopper configured to supply each of the plurality of seeding units.

9. The of claim 1, wherein at least one of the first and second sources comprises a fertilizer hopper, and wherein the air source provides fertilizer to the metering module via a fertilizer delivery tube.

10. The combination of claim 1, wherein the third product is fertilizer.

11. The combination of claim 1, wherein the tractor comprises a second metering module.

12. A method of controlling an air seeder, the method comprising:
conveying a first product from a first source positioned on the air seeder to a first distribution assembly, comprising controlling flow of the first product via control of a first gate by a controller;
conveying a second product from a second source positioned on the air seeder to a second distribution assembly, comprising controlling flow of the second product via control of a second gate by the controller;
conveying a third product from a third source to the air seeder, wherein the third source is positioned on a tractor that is configured to pull the air seeder across an agricultural field, and wherein conveying the third product comprises controlling flow of the third product by the controller;
blowing air from an air source to move the first product from the first distribution assembly and to move the second product from the second distribution assembly to a metering module;
receiving a combined product in the metering module, wherein the combined product comprises the first product from the first distribution assembly and the second product from the second distribution assembly;
activating the metering module to deliver the combined product to a seeding unit;
determining a dispense activation delay by measuring a delay between activation of the metering module and detection of the combined product passing through the seeding unit at a location downstream of the metering module; and
controlling the metering module based at least in part upon the dispense activation delay.

13. The method of claim 12, further comprising determining a plurality of dispense activation delays, each corresponding to one of a plurality of product dispensing sections having a respective metering module.

14. The method of claim 13, comprising generating and logging georeferenced application data corresponding to the combined product applied by the plurality of product dispensing sections, wherein the georeferenced application data is generated based upon the dispense activation delay of each of the plurality of product dispensing sections.

15. The method of claim 13, further comprising displaying the dispense activation delay for each of the plurality of product dispensing sections.

16. The method of claim 12, further comprising:
receiving a position signal and a product application map; and
controlling automatic activation of the metering module based upon the position signal and the product application map.

* * * * *